S. S. CASKEY.
VALVE.
APPLICATION FILED MAY 12, 1908.
944,598.
Patented Dec. 28, 1909.
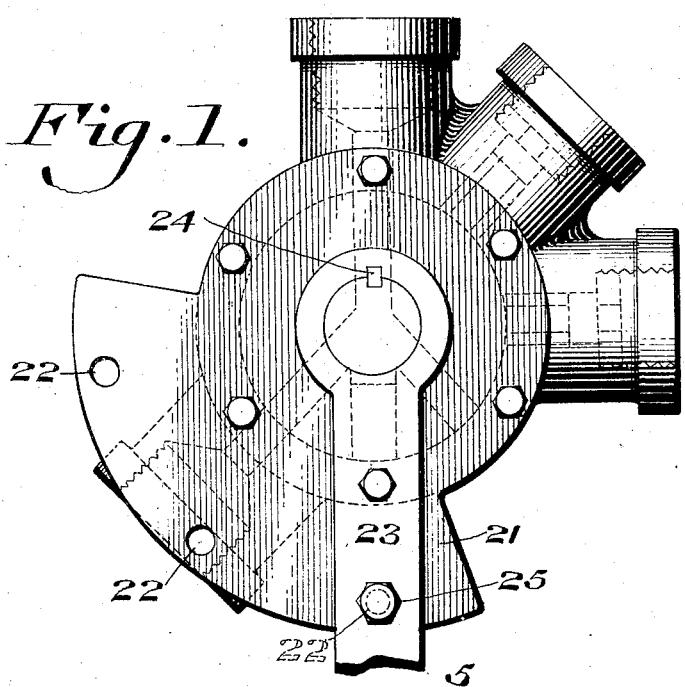
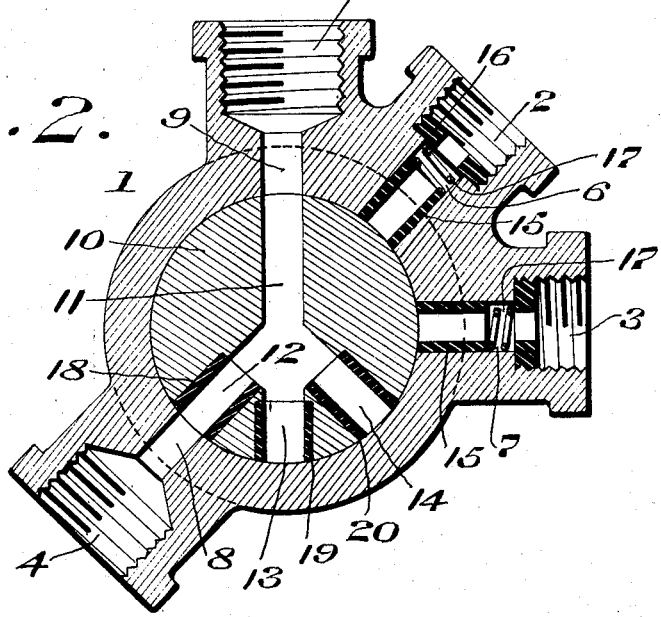

UNITED STATES PATENT OFFICE.

SAMUEL S. CASKEY, OF PHILADELPHIA, PENNSYLVANIA, ASSIGNOR TO CASKEY VALVE COMPANY, OF PHILADELPHIA, PENNSYLVANIA, A CORPORATION OF NEW YORK.

VALVE.

944,598.  Specification of Letters Patent.  Patented Dec. 28, 1909.

Application filed May 12, 1908. Serial No. 432,541.

*To all whom it may concern:*

Be it known that I, SAMUEL S. CASKEY, a citizen of the United States, residing in the city and county of Philadelphia, State of Pennsylvania, have invented a new and useful Valve, of which the following is a specification.

My invention relates to a new and useful valve which is adapted for use with steam or air, as a hydraulic or a blow-off valve, and consists in providing means carried by the body of the valve and by the plug thereof, whereby the valve becomes more effective as the pressure is increased.

It further consists of sealing bushings which are carried by the body portion and by the plug to prevent leakage around the latter.

It further consists of other novel features of construction, all as will be hereinafter fully set forth.

Figure 1 represents a side elevation of a valve embodying my invention. Fig. 2 represents a sectional view thereof.

Similar numerals of reference indicate corresponding parts in the figures.

Referring to the drawings. It is well known that the vital parts of hydraulic systems are the operative valves and stop valves and the expense of such systems is in the repairs that must be made on the valves aside from the fact that while all such valves are standing idle, they are wasting energy at high pressure, said waste returning through the exhaust pipe to the pump tank and it is further well known that with the present form of valves the grit which comes through the pipe, even though the water be filtered, may prevent closure of the valve, thus permitting leakage and forming grooves in the valve, as will be evident.

My invention is designed to overcome these defects and in the drawings, I have shown a construction which I have found in practice to operate successfully, but it will be evident that the arrangement of the parts may be varied and other instrumentalities may be employed which will come within the scope of my invention and I do not therefore desire to be limited in every instance to the exact construction as herein shown and described but desire to make such changes as may be necessary.

1 designates the body of the valve having a threaded opening 2 and a threaded opening 3, one, as for example 2, being for high pressure and the other 3, being for low pressure, it being understood that by these means, I have shown the valve adapted for high and low pressure, although, if desired, I may add another opening for a medium pressure but as the operation of the valve and the construction of the parts are the same, I have only shown two. Said openings 2 and 3 form the pressure ends which are adapted to be connected up with an accumulator, compressor or boiler depending upon the use desired.

4 designates a threaded opening by which the valve is connected to the arm for hydraulic use, with the engine for the air and with a pipe which discharges to the atmosphere when the valve is used as a blow-off.

5 designates an exhaust opening which is connected with a pipe leading to any suitable point.

6 designates a bore in the body communicating with the threaded opening 2, 7 a bore in the body communicating with the threaded opening 3, 8 a bore in the body being threaded with opening 4 and 9 a bore in the body communicating with threaded opening 5.

10 designates a circular plug the walls of which are straight and which is seated in a suitable curved opening in the body 1 and is suitably connected therewith in any desired manner. In said plug is a bore 11 with branches 12, 13 and 14 leading at suitable angles therefrom and which are adapted by the movement of the plug to be placed in proper position with respect to the various bores in the body, as will be hereinafter described, it being understood that I will describe the plug 10 as being rotated in the body 1 but if it is desired or necessary, the plug may be stationary and the body 1 may rotate around the plug with the same effect in which event flexible connections will be made for the body portion 1.

While I have called for a rotatable plug in the description and the claims, I desire it understood that either the body 1 or the plug 7 may be rotated as may be required, it being simply necessary to have relative rotation between the plug and the body.

15 designates sealing bushings, one of which is mounted in the bore 6 in the body and the other in the bore 7 thereof, the inner faces of said bushings being curved to correspond to the curvature of the wall of the plug 10 and with which said bushings make a ground-joint connection, it being understood that the bushings are preferably of soft metal and that a suitable bore is provided in the bushings.

16 designates retaining plugs which are screwed or otherwise secured in the body at a suitable point with respect to the bushings 15 and between which and the bushings are mounted the springs 17 which serve to hold the bushings firmly against the plug 10, said springs assisting the pressure in its action, since it will be noted that the direction of the pressure is such that it will tend to cause the said bushings to be firmly held against said plug 10.

18, 19 and 20 designate sealing bushings which are movably mounted in the branches 12, 13 and 14 of the plug 10, with their ends suitably curved to correspond to the curvature of the wall of the body 1, in which the plug is situated, so that said bushings form a ground-joint therewith and it will be noted that the said bushings are so situated as to be forced against the wall of the opening in the body 1 by reason of the pressure of the valve.

The operation of the valve will be readily apparent. When the plug 10 is in the position seen in Fig. 2, the bore 11 is in communication with the bore 9 leading to the exhaust 5 while the branch 12 and the bore of the bushing 18 is in communication with the bore 8 of the body 1 leading to the opening 4 so that said valve is exhausting, as will be evident. By proper rotation of the plug 10 the bore 11 in the plug is brought into proper communication with the bore of the bushing 15 and with the bore 6 of the body and the branch 13 is brought into communication with the bore 8. In this position of the plug high pressure is passing through the valve and to the engine, the branches 12 and 14 being closed, as will be evident. It will be noted that the direction of the pressure will tend to cause the bushing 15 in the bore 6 and the bushing 19 in the branch 13 to be forced and seated firmly against their proper wall forming a positive seal and preventing any leakage in any direction. By another proper turn of the plug 10, the bore 11 is brought into communication with the bore of the bushing 15, seated in the bore 7 of the body, while the branch 14 is brought into communication with the bore 8 of the body so that low pressure will be passing through the valve. In order to properly position the valve, I provide an off-set 21 shown in Fig. 1 and in this figure it is shown as a segment which is provided with suitable openings 22, located in such a manner that when the plug is rotated by means of the handle 23, suitably connected therewith, in the present instance by a key 24, or when the handle 23 is in such position that a pin 25, can pass into any one of the openings 22, the plug 10 and its bore and branches will be suitably located with respect to the desired bore in the body 1.

Having thus described my invention what I claim as new and desire to secure by Letters Patent, is:—

1. In a valve, a body having a plurality of pressure bores, a circular opening in said body, a rotatable cylindrical plug seated in said opening contacting with the walls thereof and having a bore therein, a plurality of branches leading from said bore, a sealing bushing in each of the bores of the pressure end of said body adapted to abut said plug and preventing leakage therebetween, and a sealing bushing in each of said branches adapted to abut the wall of said body, the bushing in one of said branches being situated between the exhaust and the discharge of the body when fluid under pressure is passing therethrough.

2. In a valve, a body having suitable pressure end bores, a circular opening in said body, a rotatable cylindrical plug seated in said opening, said plug having a suitable bore and branches leading therefrom, said body and plug being adapted for relative rotation, a sealing bushing in each of the pressure end bores of said body and abutting said plug for preventing leakage, and a sealing bushing in each of the branches of said plug abutting said body, the bushing in one of said branches being situated between the exhaust and the discharge of the body when fluid under pressure is passing therethrough.

SAMUEL S. CASKEY.

Witnesses:
H. A. GAWTHROP,
WM. CANER WIEDERSEIM.